United States Patent
Sachs et al.

(10) Patent No.: US 10,284,477 B2
(45) Date of Patent: May 7, 2019

(54) INDICATING QUALITY OF SERVICE OF A MESSAGE INTENDED FOR A MACHINE TYPE COMMUNICATION DEVICE IN A CAPILLARY NETWORK

(71) Applicant: Telefonaktiebolaget LM Ericsson (publ), Stockholm (SE)

(72) Inventors: Joachim Sachs, Sollentuna (SE); Ari Keränen, Helsinki (FI); Johan Rune, Lidingö (SE); Anders E. Eriksson, Kista (SE); Francesco Militano, Stockholm (SE); Nicklas Beijar, Kirkkonummi (FI); Vlasios Tsiatsis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 15/310,661

(22) PCT Filed: Jun. 2, 2014

(86) PCT No.: PCT/SE2014/050664
§ 371 (c)(1),
(2) Date: Nov. 11, 2016

(87) PCT Pub. No.: WO2015/187067
PCT Pub. Date: Dec. 10, 2015

(65) Prior Publication Data
US 2017/0085490 A1    Mar. 23, 2017

(51) Int. Cl.
*H04W 4/70* (2018.01)
*H04L 12/859* (2013.01)
(Continued)

(52) U.S. Cl.
CPC ...... *H04L 47/2475* (2013.01); *H04L 47/2491* (2013.01); *H04L 47/50* (2013.01);
(Continued)

(58) Field of Classification Search
CPC ...... H04L 47/2475; H04L 47/50; H04W 4/70; H04W 88/16; H04W 28/24
See application file for complete search history.

(56) References Cited

U.S. PATENT DOCUMENTS 6,898,641 B1 * 5/2005 Kobayashi ............ H04L 45/00
709/238
2011/0310737 A1 * 12/2011 Klingenbrunn ... H04W 36/0044
370/235

(Continued)

FOREIGN PATENT DOCUMENTS

EP    1672864 A1    6/2006

OTHER PUBLICATIONS

Extending LTE to support MTC Misic et al. Jun. 2012 IEEE (Year: 2012).*
(Continued)

Primary Examiner — Rina C Pancholi
(74) Attorney, Agent, or Firm — Sage Patent Group

(57) ABSTRACT

The present invention relates to methods and devices for indicating Quality of Service (QoS) of a message intended for a Machine Type Communication (MTC) device in a capillary network.
Thus, provided is, i.e., a method at a core network node of determining QoS of a message intended for an MTC device in a capillary network. The method comprises receiving a message on a destination port, a number of which destination port indicates a required QoS with which the message should be sent towards the MTC device, and deriving the required QoS from the destination port number. The method
(Continued)

further comprises transferring the message in accordance with the required QoS towards the MTC device.

11 Claims, 6 Drawing Sheets

(51) Int. Cl.
| | | |
|---|---|---|
| *H04L 12/863* | (2013.01) | |
| *H04W 28/02* | (2009.01) | |
| *H04L 12/857* | (2013.01) | |
| *H04W 88/16* | (2009.01) | |

(52) U.S. Cl.
CPC ......... *H04W 4/70* (2018.02); *H04W 28/0268* (2013.01); *H04W 28/0215* (2013.01); *H04W 88/16* (2013.01)

(56) References Cited

U.S. PATENT DOCUMENTS

2015/0023164 A1\* 1/2015 Starsinic ................. H04W 4/70
370/230
2016/0330647 A1\* 11/2016 Iwai ................. H04W 28/0268

OTHER PUBLICATIONS

Examination Report for European Patent Application No. 14737048.0, dated Sep. 19, 2017, 6 pages.
International Preliminary Report on Patentability for Inernational Patent Application No. PCT/SE2014/050664, dated Dec. 15, 2016, 8 pages.
Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.
Makris, Prodromos, et al., "A Context-Aware Backhaul Management Solution for combined H2H and M2M traffic," International Conference on Computer, Information and Telecommunication Systems (CITS), May 7-8, 2013, IEEE, 5 pages.
Mišić, Vojislav, B., et al., "Extending LTE to Support Machine-Type Communications," Workshop on Telecommunications: From Research to Standards, Jun. 10-15, 2012, IEEE, pp. 6977-6981.
Motorola Mobility, "S2-123769: Key Issue: Supporting Different MTC Enablement Frameworks," 3rd Generation Partnership Project (3GPP), SA WG2 Meeting #93 (Temporary Document), Oct. 8-12, 2012, 4 pages, Sofia, Bulgaria.
International Search Report for International Patent Application No. PCT/SE2014/050664, dated Sep. 29, 2014, 4 pages.

\* cited by examiner ated Services Code Point (DSCP) in an Internet
INDICATING QUALITY OF SERVICE OF A MESSAGE INTENDED FOR A MACHINE TYPE COMMUNICATION DEVICE IN A CAPILLARY NETWORK This application is a 35 U.S.C. § 371 national phase filing of International Application No. PCT/SE2014/050664, filed Jun. 2, 2014, the disclosure of which is incorporated herein by reference in its entirety.

TECHNICAL FIELD

The invention relates to methods and devices for indicating Quality of Service of a message intended for a Machine Type Communication device in a capillary network. The invention further relates to computer programs performing the methods according to the present invention, and computer program products comprising computer readable medium having the computer programs embodied therein.

BACKGROUND

Over the last years, a cellular communications network structure known as the Internet of Things has emerged. Generally, this network structure comprises a huge number of small autonomous devices, which typically, more or less infrequently (e.g. once per week to once per minute) transmit and receive only small amounts of data, or are polled for data. These devices are sometimes referred to as Machine Type Communication (MTC) devices, Machine-to-Machine (M2M) devices or just Machine Devices (MDs), and are generally assumed not to be associated with humans, but are rather sensors or actuators of different kinds, which typically communicate with application servers (which configure and receive data from the devices) within or outside the cellular network.

With the nature of MTC devices and their assumed typical uses follow that these devices generally will have to be energy efficient, since external power supplies not necessarily are available and since it is neither practically nor economically feasible to frequently replace or recharge their batteries. In some scenarios the MTC devices may not even be battery powered, but may instead rely on energy harvesting, i.e. gathering energy from the environment, opportunistically utilizing the (often very limited) energy that may be tapped from sun light, temperature gradients, vibrations, etc. So far, the MTC related work in 3rd Generation Partnership Project (3GPP) has focused on MTC devices directly connected to the cellular network via the radio interface of the cellular network. However, a scenario which is likely to be more prevalent is that most MTC devices connect to the cellular network via a gateway. In such scenarios the gateway acts like a User Equipment (UE) towards the cellular network while maintaining a local network, typically based on a short range radio technology towards the MTC devices. Such a local network, which in a sense extends the reach of the cellular network (to other radio technologies but not necessarily in terms of radio coverage) has been coined capillary network and the gateway connecting the capillary network to the cellular network is thus referred to as a capillary network gateway (CGW). Hence, the capillary network comprises one or more CGWs and a plurality of MTC devices, which connect to a Radio Access Network (RAN) of an available cellular communications network via the one or more CGWs.

Radio technologies that are expected to be common in capillary networks include e.g. IEEE 802.15.4 (e.g. with IPv6 over Low power Wireless Personal Area Networks (6LoWPAN) or ZigBee as higher layers), Bluetooth Low Energy or low energy versions of the IEEE 802.11 family (i.e. Wi-Fi). A capillary network may be single hop (i.e. all MTC devices have a direct link to the CGW), e.g. a Wi-Fi network with the CGW as the access point, or multi-hop (i.e. some MTC devices may have to communicate via one or more other MTC devices to reach the CGW), e.g. an IEEE 802.15.4+ZigBee network with the CGW being a Personal Area Network (PAN) controller. In multi-hop cases, the Routing Protocol for Low-Power and Lossy Networks (RPL) may be used. In principle, RPL may be used also in single hop networks, but there is less need for a routing protocol in such networks.

The field of capillary networks is still not abundantly explored and many issues are still to be resolved. For instance, a problem to be solved is how to control Quality of Service (QoS) for capillary networks.

When a sending network node in a communications network, such as the Internet, is sending a message to receiving network node, the sending network node may need to indicate required QoS of the message in order to be able to distinguish between critical network traffic such as voice data and non-critical traffic, e.g. file transfers, for the purpose of providing the respective traffic class with appropriate QoS. The QoS is typically indicated by specifying a Differentiated Services Code Point (DSCP) in an Internet Protocol (IP) packet header, but DSCPs can be modified by administrative domains on the path. Therefore, the DSCP observed in the Evolved Packet System (EPS) in a Long Term Evolution (LTE) or in the capillary network not necessary the same as the DSCP originally intended by the sending network node.

SUMMARY

An object of the present invention is to solve, or at least mitigate this problem in the art, and to provide an improved method of indicating QoS to an MTC device in a capillary network.

This object is attained in a first aspect of the present invention by a method at a sending network node of indicating Quality of Service (QoS) of a message intended for a Machine Type Communication (MTC) device in a capillary network. The method comprises selecting a required QoS for the message to be sent to the MTC device, and associating the selected required QoS with a destination port number. Further, the method comprises sending the message to the destination port, the number of which indicates the selected QoS, wherein a recipient of the message is capable of determining from the destination port number with which required QoS the message should be transferred to the MTC device.

This object is attained in a second aspect of the present invention by a method at a core network node of determining QoS of a message intended for an MTC device in a capillary network. The method comprises receiving a message on a destination port, a number of which destination port indicates a required QoS with which the message should be sent towards the MTC device, and deriving the required QoS from the destination port number. The method further comprises transferring the message in accordance with the required QoS towards the MTC device.

This object is attained in a third aspect of the present invention by a method at a capillary network gateway (CGW) node of determining QoS of a message intended for an MTC device in the capillary network. The method comprises receiving a message on a destination port, a number of which destination port indicates a required QoS with which the message should be sent to the MTC device, and deriving the required QoS from the destination port number. The method further comprises transferring the message in accordance with the required QoS towards the MTC device.

This object is attained in a fourth aspect of the present invention by a method at an MTC device in a capillary network of determining QoS of a message. The method comprises receiving the message on a destination port, a number of which destination port indicates a required QoS with which the message was sent to the MTC device, and deriving the required QoS from the destination port number.

Further, a sending node according to the first aspect of the present invention configured to indicate QoS of a message intended for an MTC device in a capillary network is provided. The sending node comprises a processing unit and a memory, which memory contains instructions executable by the processing unit, whereby the sending node is operative to select a required QoS for the message to be sent to the MTC device, to associate the selected required QoS with a destination port number, and to send the message to the destination port, the number of which indicates the selected QoS, wherein a recipient of the message is capable of determining from the destination port number with which required QoS the message should be transferred to the capillary network device.

Further, a core network node according to the second aspect of the present invention configured to determine QoS of a message intended for an MTC device in a capillary network is provided. The core network node comprises a processing unit and a memory, which memory contains instructions executable by the processing unit, whereby the network node is operative to receive a message on a destination port, a number of which destination port indicates a required QoS with which the message should be sent to the MTC device, to derive the required QoS from the destination port number, and to transfer the message in accordance with the required QoS towards the MTC device.

Moreover, a CGW node according to the third aspect of the present invention configured to determine QoS of a message intended for an MTC device in a capillary network is provided. The CGW node comprises a processing unit and a memory, which memory contains instructions executable by the processing unit, whereby the network node is operative to receive a message on a destination port, a number of which destination port indicates a required QoS with which the message should be sent to the MTC device, to derive the required QoS from the destination port number, and to transfer the message in accordance with the required QoS towards the MTC device.

Finally, an MTC device according to the fourth aspect of the present invention is provided in a capillary network and is configured to determine QoS of a message. The MTC device comprises a processing unit and a memory, which memory contains instructions executable by the processing unit, whereby the MTC device is operative to receive the message on a destination port, a number of which destination port indicates a required QoS with which the message was sent to the MTC device, and derive the required QoS from the destination port number.

Further provided are computer programs performing the methods according to the present invention, and computer program products comprising computer readable medium having the computer programs embodied therein.

Advantageously, by having a sending network node according to a first aspect of the invention, being for a instance a computer on the Internet wishing to communicate with an MTC device, selecting a required QoS for a message to be sent to the MTC device and associating the selected required QoS with a destination port number identifying the specific destination port on which the message is sent, the specific destination port number will indicate a particular QoS of the message.

In an exemplifying embodiment, the sending network node is capable of assigning e.g. five different values of QoS to the message intended for the MTC device: QoS 1-QoS 5. Each QoS will then be represented by a particular destination port number (PN), for instance PN 30-34. Thus, if the message is sent to PN 30, QoS 1 is required, if the message is sent to PN 31, QoS 2 is required, and so on. The exact mapping between QoS and destination port number must be agreed upon by the sending network node and a recipient.

Thus, the sending network node sends the message to the destination port, the number of which advantageously indicates the selected QoS, wherein a recipient of the message is capable of determining from the destination port number with which required QoS the message should be transferred to the MTC device.

Hence, a recipient in the form of a core network node such as a Packet Data Network Gateway (PGW) in the EPS of an LTE network, or any other appropriate core network node, according to the second aspect of the present invention receives the message subsequently intended for the MTC device on the destination port, the number of which destination port indicates a required QoS with which the message should be sent to the MTC device. For instance, if the message is received on PN 31 in line with the above, the PGW derives the required QoS (i.e. QoS 2) from destination port number 31, and transfers the message in accordance with the required QoS towards the MTC device.

When a sending network node (such as an application running on a computer) sends a message towards an MTC device over a communications network e.g. the Internet, the application may need to indicate the required QoS of the message. For instance, high-priority messages to MTC alarms or actuators may require a high QoS resulting in, for example, a higher priority or shorter time of delivery for a message. As previously described, DSCP has been used in the art to indicate QoS, but a problem is that the DCSP is not preserved in networks (such as the Internet) traversed before reaching the EPS and/or capillary network, but can be amended within an administrative domain; an operator is free to interpret the DSCP value in any way or to re-classify a packet into another DSCP. DSCPs are intended to be used within an administrative domain with classification at the border of the domain. Several intermediate operators may be on the path from a sender to a capillary network. There is thus no guarantee that the DSCP at the capillary network is the same as the DSCP set by the sender.

Advantageously, with the present invention, the required QoS of a particular message being sent towards the MTC device is mapped to the port number of the destination port to which the message is sent, such that a recipient can determine the required QoS from the number of the destination port used. The destination port number is to its nature fixedly set, and thus cannot be altered along the path of the message towards the EPS and the capillary network.

After the PGW has received the message, determined the required QoS, and sent the message downstream towards the MTC device, to which the message is intended, in accordance with the required QoS provided to the message, a capillary network gateway (CGW) node according to a third aspect of the present invention receives the message from the PGW. Similarly to the PGW, the CGW node receives the message on the selected destination port, the number of which destination port indicates the required QoS with which the message should be sent to the MTC device. In line with the functionality of the previously described PGW, the CGW node can thus derive the required QoS from the destination port number and transfer the message with the required QoS to the intended MTC device for which the CGW node serves as a gateway in the capillary network. Subsequently, the MTC device receives the message on the destination port that originally was selected by the sending network node.

Advantageously, an MTC device according to a fourth aspect of the present invention receiving the message on the destination port, the number of which destination port indicates a required QoS with which the message was sent to the MTC device, and derives the required QoS from the destination port number.

In a further embodiment of the MTC device according to the invention, the MTC device advantageously returns messages to the sending node with the QoS derived from the destination port number.

In an embodiment of the present invention, the PGW advantageously selects for the message a bearer type and/or priority queue complying with the required QoS with which the message should be sent towards the MTC device. For instance, a bearer type guaranteeing a minimum bit rate can be selected, and messages can be placed in a priority queue to be given precedence over other less prioritized messages.

In yet an embodiment of the present invention, the PGW advantageously derives, from the destination port number, a predetermined QoS Class identifier, QCI, representing the required QoS. The QCI is an established measure of quality of service and can thus be used between different domains, networks and device.

In still another embodiment of the present invention, the PGW uses a so called Traffic Flow Template, TFT, or corresponds with another entity such as a Policy and Charging Rules Function (PCRF) to obtain the TFT, to derive the required QoS from the destination port number. For instance, the mapping of the destination port number to the required QoS may be constructed such that when the TFT is applied to the destination port number, the required QoS is acquired in the form of the well established QCI.

In another embodiment of the present invention, the PGW modifies the destination port of the received message to a predetermined standardized destination port when forwarding the message. This is typically a default port assigned for the protocol being used. For instance, in case Constrained Application Protocol (CoAP) is used, the predetermined default port has number 5683. This embodiment has the advantage that the MTC device ultimately only has to listen to this single port.

In still a further embodiment of the present invention, the PGW marks the message with a DSCP indicating the required QoS to the MTC device after the required QoS has been derived from the destination port number.

In an embodiment of the present invention, the CGW node receives the message from the PGW and selects, for the message to be sent to the MTC device, a priority queue and/or a capillary network QoS complying with the required QoS with which the message should be sent, the required QoS being derived from the destination port number. In an alternative embodiment, the selection is performed based on the DSCP received from the PGW with the message. In still an alternative embodiment, if the PGW modifies the destination port of the received message to a predetermined standardized destination port when forwarding the message as previously described, the CGW node selects, for the message to be sent to the MTC device, a priority queue and/or a capillary network QoS based on a bearer on which the message was received at the CGW node from the PGW.

In yet an embodiment of the present invention, the CGW node modifies the destination port of the received message to a predetermined standardized destination port when forwarding the message. As previously discussed, this is typically a default port assigned for the protocol being used. For instance, in case Constrained Application Protocol (CoAP) is used, the predetermined default port has number 5683. This embodiment has the advantage that the MTC device ultimately only has to listen to this single port.

In still a further embodiment of the present invention, the CGW node marks the message with a DSCP indicating the required QoS to the MTC device after the required QoS has been derived from the destination port number.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
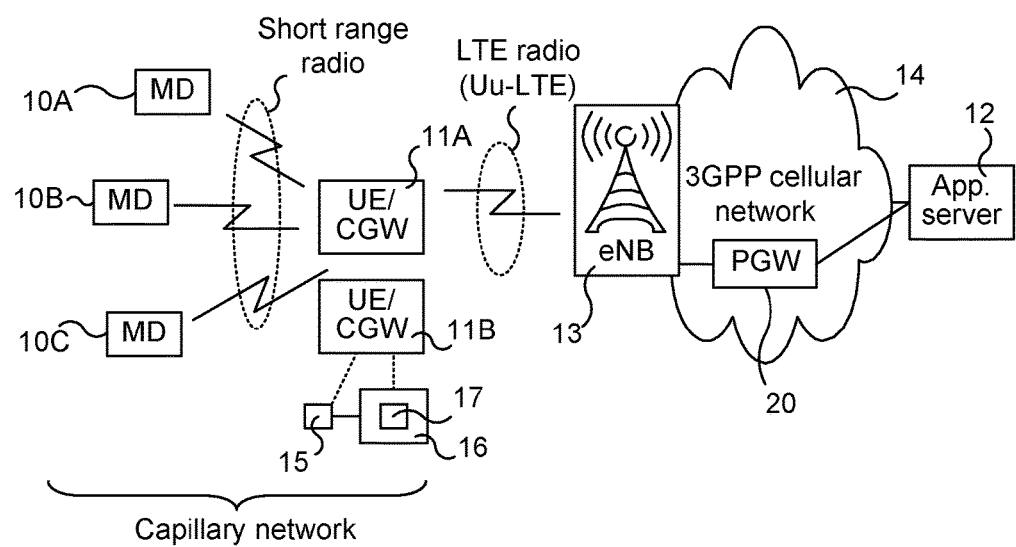
FIG. 1 illustrates a prior art capillary network in which embodiments of the present invention can be implemented.

FIG. 1 illustrates a prior art capillary network in which embodiments of the present invention can be implemented. A number of wireless devices referred to as Machine Devices (MDs) or Machine Type Communication (MTC) devices 10A, 10B, 10C connect to one or more Capillary Network Gateways (CGWs) 11A, 11B, typically via short range radio communication such as Near Field Communications (NFC), Radio-Frequency Identification (RFID), Wireless Local Area Network (WLAN), Bluetooth or any technology utilizing the IEEE 802.15.4 standard, such as ZigBee or MiWi. The capillary network may for instance be implemented in a factory setting where the MTC devices 10A, 10B, 10C could amount to hundreds or even thousands of sensors for measuring physical properties (such as temperature, pressure, energy consumption, etc.) of an industrial process and reporting via the CGWs 11A, 11B in the form of Wi-Fi Access Points (APs) to one or more application servers 12 via an eNodeB 13 of a RAN and a node such as a Packet Data Network Gateway (PGW) 20 in an LTE network 14.

With further reference to FIG. 1, different aspects of the present invention could be implemented in different nodes, such as in the MTC devices 10A, 10B, 10C, the CGWs 11A, 11B, the PGW 20 and the application server 12, as will be described in the following. One network node according to embodiments of the present invention is exemplified to be the CGW 11B. In practice, the method performed at the CGW 11B is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. Thus, as is illustrated by means of dashed lines in FIG. 1, the processing unit 15 and the storage medium are included in the proxy 13. The processing unit 15 is arranged to carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a Digital Versatile Disc (DVD) or a memory stick. As a further alternative, the computer program 17 may be downloaded to the storage medium 16 over a network. The processing unit 15 may alternatively be embodied in the form of a digital signal processor (DSP), an application specific integrated circuit (ASIC), a field-programmable gate array (FPGA), a complex programmable logic device (CPLD), etc. Further, even though not shown in FIG. 1, the MTC devices 10A, 10B, 10C, the PGW 20 and the application server 12 each typically comprise a corresponding processing unit and memory unit comprising a computer program executable by the processing unit.

Figure 2A:
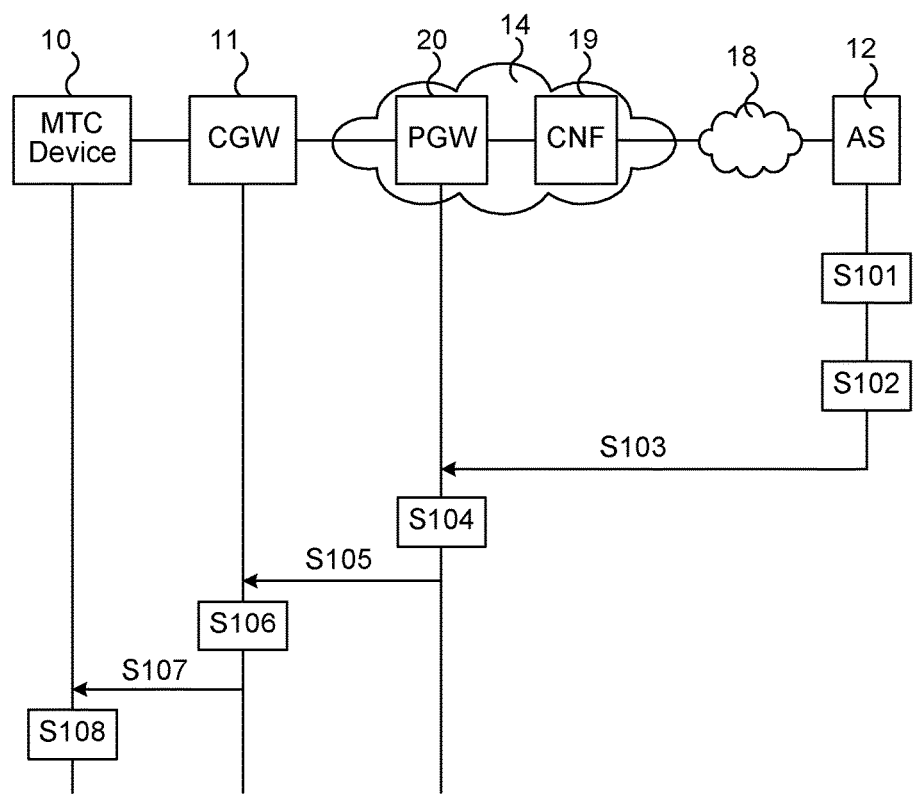
FIGS. 2a-c illustrates different embodiments of the present invention.

FIG. 2a illustrates an embodiment of the present invention where an MTC device 10 listens to several destination ports, where each port number is associated with a given QoS. In this embodiment, the destination port number is used from a sending network node 12 all the way to the MTC device 10.

The sending network node according to the first aspect of the invention, being for a instance an application server 12 on the Internet 18 wishing to communicate with the MTC device 10, selects in step S101 a required QoS for a message to be sent to the MTC device 10 and associates in step S102 the selected required QoS with a destination port number identifying the specific destination port on which the message is sent. The specific destination port number will indicate a particular QoS of the message.

As previously exemplified, the application server 12 is capable of assigning e.g. five different values of QoS to the message intended for the MTC device 10: QoS 1-QoS 5. Each QoS will then be represented by a particular destination port number (PN), for instance PN 30-34; if the message is sent to PN 30, QoS 1 is required, if the message is sent to PN 31, QoS 2 is required, and so on. The exact mapping between QoS and destination port number must be agreed upon by the sending network node and a recipient.

The application server 12 sends in step S103 the message to the destination port, the number of which advantageously indicates the selected QoS, wherein a recipient of the message is capable of determining from the destination port number with which required QoS the message should be transferred to the MTC device 10. In this particular embodiment, a PGW 20 of the EPC network 14 receives, via a Capillary Network Function (CNF) 19, the message and is capable of determining from the destination port number with which required QoS the message subsequently should be transferred to the MTC device 10.

Hence, the PGW 20 in the EPC 14 of an LTE network, or any other appropriate core network node, according to the second aspect of the present invention receives in step S103 the message intended for the MTC device 10 on the destination port, the number of which destination port indicates a required QoS with which the message should be sent to the MTC device 10. For instance, if the message is received on PN 31 in line with the above, the PGW 20 derives in step S104 the required QoS (i.e. QoS 2) from destination port number 31, and transfers in step S105 the message in accordance with the required QoS towards the MTC device 10.

In an embodiment of the present invention, the PGW 20 advantageously selects for the message, when performing the transfer in step S105, a bearer type and/or priority queue complying with the required QoS with which the message should be sent towards the MTC device 10. For instance, a bearer type guaranteeing a minimum bit rate can be selected, and messages can be placed in a priority queue to be given precedence over other less prioritized messages.

In yet an embodiment of the present invention, the PGW 20 derives in step S104, from the destination port number, a predetermined QCI representing the required QoS. The QCI is an established measure of quality of service and can thus advantageously be used between different domains, networks and devices.

In still another embodiment of the present invention, the PGW 20 uses a so called Traffic Flow Template, TFT, or corresponds with another entity such as a Policy and Charging Rules Function (PCRF) to obtain the TFT, to derive the required QoS from the destination port number. For instance, the mapping of the destination port number to the required QoS may be constructed such that when the TFT is applied to the destination port number, the required QoS is acquired in the form of the well established QCI.

With further reference to FIG. 2a, after the PGW 20 has received the message in step S103, determined the required QoS in step S104, and sent the message towards the MTC device 10 in step S105 such that the message satisfies the required QoS, a CGW node 11 according to the third aspect of the present invention receives the message from the PGW 20.

In a similar process as that undertaken at the PGW 20 as described hereinabove, the CGW 11 receives in step S105 the message on the selected destination port, the number of which destination port indicates the required QoS with which the message should be sent to the MTC device 10. In line with the functionality of the previously described PGW 20, the CGW 11 derives in step S106 the required QoS from the destination port number and transfers the message complying with the required QoS to the MTC device 10 for which the CGW 11 serves as a gateway in the capillary network. This may, in line with the approach used at the PGW 20, be undertaken by the CGW 11 by selecting a bearer type and/or priority queue complying with the required QoS with which the message should be sent towards the MTC device 10.

The MTC device 10 according to the fourth aspect of the present invention receives in step S107 the message on the destination port that initially was selected by the application server 12 in step S101. The number of the destination port indicates a required QoS with which the message was sent to the MTC device 10, which finally derives the required QoS from the destination port number in step S108.

Again with reference to FIG. 2*a*, in an embodiment, since the MTC device 10 is made aware of the QoS with which the message initially was sent, the MTC device 10 is advantageously capable of returning messages to the application server 12 with the QoS initially derived from the destination port number.

Figure 2B:
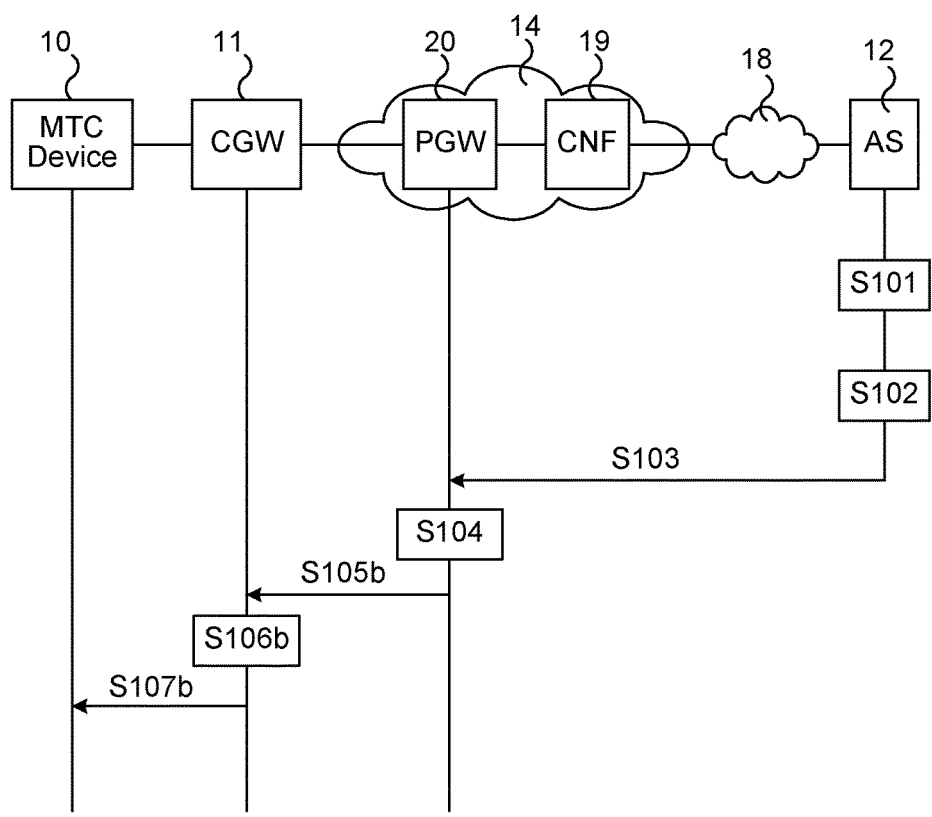

FIG. 2*b* shows a further embodiment of the present invention, where the MTC device 10 listens on a single destination port. This further embodiment is identical to that illustrated in FIG. 2*a* up until step S104 where the PGW 20 derives the required QoS from the destination port number of the destination port on which the message is received from the application server 12. However, in this particular embodiment, the destination port number is used from the application server 12 to the PGW 20.

After having derived the required QoS in step S104, the PGW modifies the destination port of the received message to a predetermined standardized destination port when forwarding the message in step S105*b*. This is typically a default port assigned for the protocol being used. For instance, in case Constrained Application Protocol (CoAP) is used, the predetermined default port has number 5683.

As previously described, the may PGW 20 advantageously select a bearer type and/or priority queue complying with the required QoS with which the message should be sent towards the MTC device 10. Further, the PGW 20 may derive a predetermined QCI representing the required QoS from the destination port number, and optionally use a TFT to derive the required QoS from the destination port number.

Hence, the message is forwarded on the standardized destination port to the CGW 11 in step S105*b*, which in step S106*b* selects priority queue and/or capillary network QoS based on the bearer over which the message is received and forwards the message in step S107*b* to the MTC device 10, which listens to a single port for the message. The embodiment illustrated in FIG. 2*b* has the advantage that the MTC device 10 ultimately only has to listen to this single port.

With further reference to FIG. 2*b*, in an embodiment, the PGW 20 marks the message, in the transferring step S105*b*, with a DSCP indicating the required QoS to the CGW 12 and MTC device 10 after the required QoS has been derived from the destination port number in step 104. The CGW 11 may select the priority queue and/or the capillary network queue based on the DSCP of the message. Advantageously, this facilitates for the MTC device 10 to return messages to the application server 12 with the QoS initially derived by the CGW 12 from the destination port number.

Figure 2C:
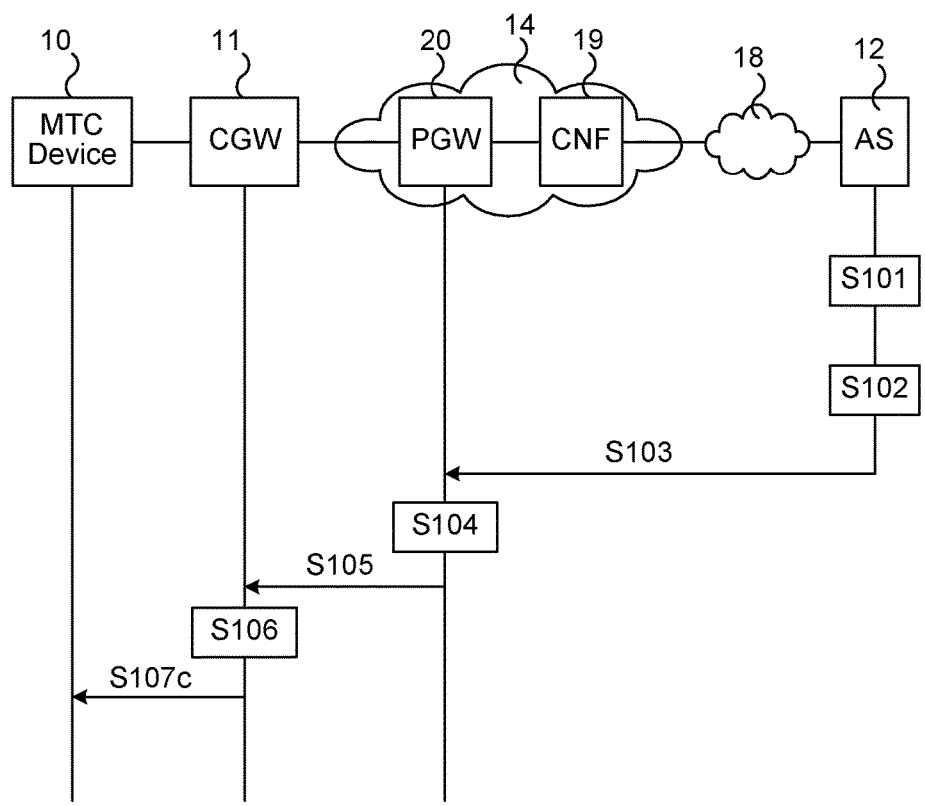

FIG. 2*c* shows a further embodiment of the present invention, where the MTC device 10 listens on a single destination port. This further embodiment is identical to that illustrated in FIG. 2*a* up until step S106 where the CGW 11 derives the required QoS from the destination port number of the destination port on which the message is received from the PGW 20. However, in this particular embodiment, the destination port number is used from the application server 12 to the CGW 11. The message will be transferred in step S107*c* in accordance with the required QoS to the MTC device 10, for instance by selecting priority queue and/or capillary network QoS based on the destination port number.

However, after having derived the required QoS in step S106, the CGW 11 modifies the destination port of the received message to a predetermined standardized destination port when forwarding the message in step S107*c*. This is typically a default port assigned for the protocol being used. For instance, in case Constrained Application Protocol (CoAP) is used, the predetermined default port has number 5683.

Thus, the message is forwarded on the standardized destination port to the MTC device 10 in step S107*c*, which listens to a single port for the message. The embodiment illustrated in FIG. 2*c* has the advantage that the MTC device 10 ultimately only has to listen to this single port.

With further reference to FIG. 2*c*, in an embodiment, the CGW 11 marks the message, in the transferring step S107*c*, with a DSCP indicating the required QoS to the MTC device 10 after the required QoS has been derived from the destination port number in step 106. Advantageously, this facilitates for the MTC device 10 to return messages to the application server 12 with the QoS initially derived by the CGW 12 from the destination port number.

Figure 3:
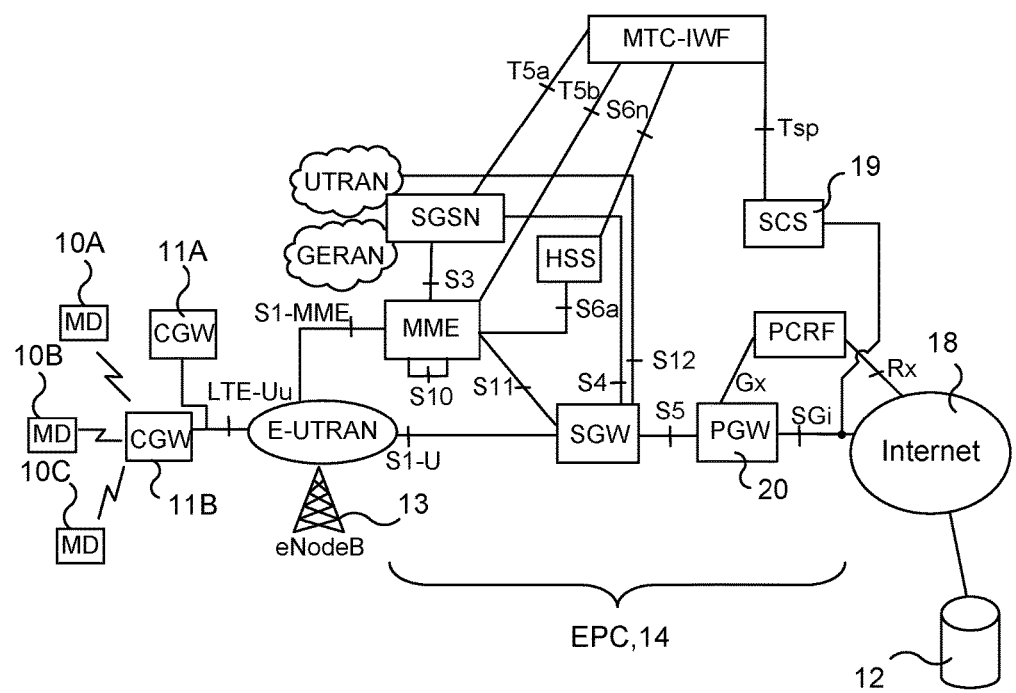
FIG. 3 illustrates different network nodes according to the present invention implemented in an LTE system.

FIG. 3 shows a schematic overview of an exemplifying wireless communication system in which the present invention can be implemented. The wireless communication system is an LTE based system. It should be pointed out that the terms "LTE" and "LTE based" system is here used to comprise both present and future LTE based systems, such as, for example, advanced LTE systems. It should be appreciated that although FIG. 3 shows a wireless communication system in the form of an LTE based system, the example embodiments herein may also be utilized in connection with other wireless communication systems, such as e.g. GSM or UMTS, comprising nodes and functions that correspond to the nodes and functions of the system in FIG. 4.

The LTE system of FIG. 3 is connected to a capillary network. Thus, the MTC devices 10A, 10B, 10C connect to the Evolved Packet Core (EPC) network 14 of the LTE system via one or more of the CGWs 11A, 11B in the eNodeB 13 in the Evolved Universal Terrestrial Radio Access Network (E-UTRAN), and further via the Internet to the application server 12.

The wireless communication system comprises one or more base stations in the form of eNodeBs, operatively connected to a Serving Gateway (SGW), in turn operatively connected to a Mobility Management Entity (MME) and a Packet Data Network Gateway (PGW) 20 as used in previously described exemplifying embodiments, which in turn is operatively connected to a Policy and Charging Rules Function (PCRF). The eNodeB is a radio access node that interfaces with a mobile radio terminal, e.g. a UE or an Access Point, or a CGW (all referred to as "UEs" in the following). The eNodeB of the system forms the E-UTRAN for LTE communicating with the UE over an air interface such as LTE-Uu. The core network in LTE is known as Evolved Packet Core (EPC), and the EPC together with the E-UTRAN is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state UEs, the SGW terminates the downlink data path and triggers paging when downlink data arrives for the UE, and further manages and stores UE contexts, e.g. parameters of the IP bearer service, network internal routing information. It also performs replication of the user traffic in case of lawful interception. The SGW communicates with the MME via interface S11 and with the PGW 20 via the S5 interface. Further, the SGW may communicate with the UMTS radio access network UTRAN and with the GSM EDGE ("Enhanced Data rates for GSM Evolution") Radio Access Network (GERAN) via the S12 interface.

The MME is responsible for idle mode UE tracking and paging procedure including retransmissions. It is involved in the bearer activation/deactivation process and is also responsible for choosing the SGW for a UE at the initial attach and at time of intra-LTE handover involving core network node relocation. It is responsible for authenticating the user by interacting with the Home Subscriber Server (HSS). The Non-Access Stratum (NAS) signaling terminates at the MME and it is also responsible for generation and allocation of temporary identities to UEs via the S1-MME interface. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the Serving General Packet Radio Service (GPRS) Support Node (SGSN). The MME also terminates the S6a interface towards the home HSS for roaming UEs. Further, there is an interface Sin configured for communication between MMEs for MME relocation and MME-to-MME information transfer.

The PGW 20 provides connectivity to the UE to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1X and EvDO). The interface between the PGW and the packet data network, being for instance the Internet, is referred to as the SGi. The packet data network may be an operator external public or private packet data network or an intra operator packet data network, e.g. for provision IP Multimedia Subsystem (IMS) services.

The PCRF determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF provides the PGW 20 with such rules and/or policies or similar to be used by the acting PGW as a Policy and Charging Enforcement Function (PCEF) via interface Gx. The PCRF further communicates with the packet data network via the Rx interface.

FIG. 3 further illustrates network nodes implemented as proposed in 3GPP TS 23.682 V11.3.0, "3rd Generation Partnership Project; Technical Specification Group Services and System Aspects; Architecture enhancements to facilitate communications with packet data networks and applications (Release 11)", December 2012, which are generally implemented for handling MTC devices in a cellular network. To the general LTE network of FIG. 3, a Machine Type Communication InterWorking Function (MTC-IWF) node and a Services Capability Server (SCS) have been added. A so called Capillary Network Function (CNF) 19 is typically implemented at the SCS level, which SCS is connected to the PGW via the SGi interface, the MTC-IWF via a Tsp interface and to the application server 12 via the Internet 18 or another packet data network, even though the application server 12 could be directly connected to the SCS.

Figure 4:
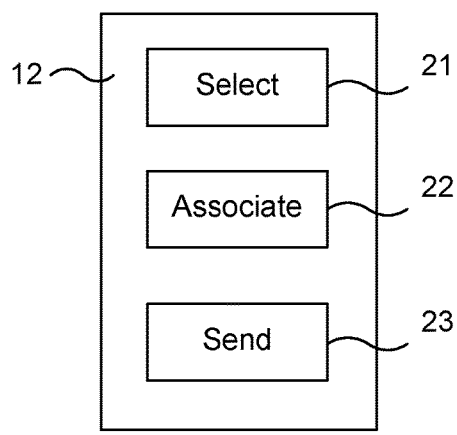
FIGS. 4-6 illustrate network nodes according to embodiments of the present invention.

FIG. 4 shows a sending node 12 according to an embodiment of the present invention, for instance an application server. The network node 12 comprises selecting means 21 adapted to select a required QoS for a message to be sent to an MTC device, associating means 22 adapted to associate the selected required QoS with a destination port number, and sending means 23 adapted to send the message to the destination port, the number of which indicates the selected QoS, wherein a recipient of the message is capable of determining from the destination port number with which required QoS the message should be transferred to the capillary network device. The selecting means 21 and/or the sending means 23 may comprise a communications interface for receiving and providing information to other devices. The selecting means 21 and the associating means 22 may comprise a local storage for storing obtained data. The selecting means 21 and/or associating means 22 and/or sending means 23 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The selecting means 21 and sending means 23 may comprise one or more transmitters and/or receivers and/or transceivers, comprising analogue and digital components and a suitable number of antennae for radio communication.

Figure 5:
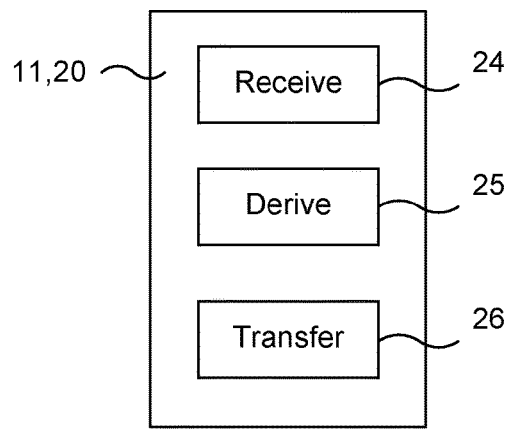

FIG. 5 shows a network node 11, 20 according to an embodiment of the present invention, for instance a PGW or a CGW. The network node 11, 20 comprises receiving means 24 adapted to receive a message on a destination port, a number of which destination port indicates a required QoS with which the message should be sent to an MTC device, deriving means 25 adapted to derive the required QoS from the destination port number, and transferring means 26 adapted to transfer the message in accordance with the required QoS towards the MTC device. The receiving means 24 and/or the transferring means 26 may comprise a communications interface for receiving and providing information to other devices. The means 24, 25, 26 of the network node 11, 20 may further comprise a local storage for storing obtained data. The receiving means 24 and/or deriving means 25 and/or transferring means 26 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The receiving means 24 and transferring means 26 may comprise one or more transmitters and/or receivers and/or transceivers, comprising analogue and digital components and a suitable number of antennae for radio communication.

Figure 6:
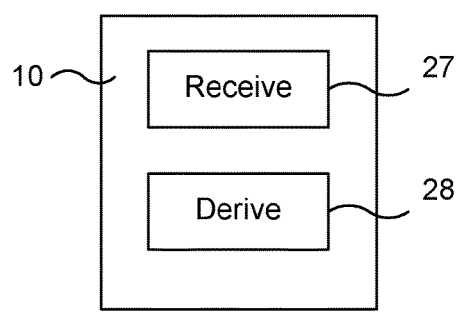

FIG. 6 shows an MTC device 10 according to an embodiment of the present invention. The network node 10 comprises receiving means 27 adapted to receive a message on a destination port, a number of which destination port indicates a required QoS with which the message was sent to the MTC device, and deriving means (28) adapted to derive the required QoS from the destination port number. The means 27 and 28 the MTC device 10 may further comprise a local storage for storing obtained data. The receiving means 27 and/or deriving means 28 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The receiving means 27 may comprise one or more receivers and/or transceivers, comprising analogue and digital components and a suitable number of antennae for radio communication.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method at a network node in a cellular network for determining Quality of Service, QoS, of a message intended for a Machine Type Communication, MTC, device in a capillary network being a short-range network, said cellular network connects to the capillary network, the method comprising:
   receiving a message on a port corresponding to a destination port, a number of the destination port indicates a required QoS with which the message should be sent to the MTC device;
   deriving the required QoS from the destination port number, wherein the deriving further comprises:
      applying a Traffic Flow Template, TFT, to the destination port number;
      deriving from the destination port number a predetermined QoS Class identifier, QCI, representing the required QoS; and
      acquiring the required QoS from the QCI;
   modifying the destination port number of the received message to a default destination port number of a utilized application protocol; and
   transferring the modified message in accordance with the required QoS towards the MTC device.

2. The method of claim 1, wherein the transferring further comprises: selecting for the modified message a bearer type and/or priority queue complying with the required QoS with which the modified message should be transferred.

3. The method of claim 2, wherein the selecting further comprises: selecting for the modified message at least one or more of the group consisting of: waiting times for determining order of simultaneous transmissions, timeslot, bandwidth reservation, and transmission power and channel.

4. The method of claim 1, wherein the transferring further comprises: transferring the modified message to the destination port indicated by the destination port number.

5. The method of claim 1, wherein the transferring further comprises: marking the modified message with a Differentiated Services Code Point, DSCP, indicating the required QoS.

6. A network node in a cellular network configured to determine Quality of Service, QoS, of a message intended for a Machine Type Communication, MTC, device in a capillary network, comprising a processing unit and a memory, said memory containing instructions executable by said processing unit, whereby said network node is operative to:
   receive a message on a port corresponding to a destination port, a number of the destination port indicates a required QoS with which the message should be sent to the MTC device;
   derive the required QoS from the destination port number, wherein the deriving further comprises:
      applying a Traffic Flow Template, TFT, to the destination port number;
      deriving from the destination port number a predetermined QoS Class identifier, QCI, representing the required QoS; and
      acquiring the required QoS from the QCI;
   modifying the destination port number of the received message to a default destination port number of a utilized application protocol; and
   transfer the modified message in accordance with the required QoS towards the MTC device.

7. The network node of claim 6, wherein the transferring further comprises:
   selecting for the modified message a bearer type and/or priority queue complying with the required QoS with which the modified message should be transferred.

8. The network node of claim 7, wherein the selecting further comprises:
   selecting for the modified message at least one or more of the group consisting of: waiting times for determining order of simultaneous transmissions, timeslot, bandwidth reservation, and transmission power and channel.

9. The network node of claim 6, wherein the transferring further comprises:
   transferring the modified message to the destination port indicated by the destination port number.

10. The network node of claim 6, wherein the transferring further comprises:
    marking the modified message with a Differentiated Services Code Point, DSCP, indicating the required QoS.

11. The network node of claim 6, being any one selected from the group comprising a Serving Gateway, SGW, a Packet Data Network Gateway, PGW, and an Evolved NodeB, eNodeB, in a Long Term Evolution, LTE, network, any one selected from the group comprising a Serving General Packet Radio Service Support Node, SGSN, a Gateway General Packet Radio Service Support Node, GGSN, a Radio Network Controller, RNC, and a NodeB, in a Universal Mobile Telecommunication System, UMTS, network, any one selected from the group comprising a Serving General Packet Radio Service Support Node, SGSN, a Gateway General Packet Radio Service Support Node, GGSN, a Base Station Controller, BSC, and a Base Transceiver Station, BTS, in a Global System for Mobile communications, GSM, network, a Services Capability Server, SCS, and an Operation and Maintenance node.

* * * * *